(12) United States Patent
Ishikawa (10) Patent No.: US 8,411,336 B2
(45) Date of Patent: Apr. 2, 2013

(54) IMAGE READER, IMAGE FORMING DEVICE HAVING THE SAME, AND COMPUTER-READABLE STORAGE MEDIUM FOR THE SAME

(75) Inventor: Hiroko Ishikawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 353 days.

(21) Appl. No.: 12/891,305

(22) Filed: Sep. 27, 2010

(65) Prior Publication Data
US 2011/0102864 A1 May 5, 2011

(30) Foreign Application Priority Data

Oct. 30, 2009 (JP) ................................. 2009-251118

(51) Int. Cl.
*H04N 1/04* (2006.01)
(52) U.S. Cl. ......... 358/498; 358/513; 358/514; 358/497
(58) Field of Classification Search .................. 358/474, 358/486, 497, 496, 498, 482, 483, 501, 505, 358/513, 514
See application file for complete search history.

(56) References Cited

U.S. PATENT DOCUMENTS

| | | | | |
|---|---|---|---|---|
| 6,301,019 | B1 * | 10/2001 | Saito et al. ..................... | 358/461 |
| 6,323,933 | B1 * | 11/2001 | Anzai ............................. | 355/23 |
| 7,283,285 | B2 * | 10/2007 | Konno .......................... | 358/497 |
| 7,502,147 | B2 * | 3/2009 | Suzuki et al. .................. | 358/504 |
| 7,518,760 | B2 * | 4/2009 | Matsuda ....................... | 358/474 |
| 7,619,785 | B2 * | 11/2009 | Sodeura et al. ............... | 358/474 |
| 7,688,477 | B2 * | 3/2010 | Ikeno et al. ................... | 358/449 |
| 7,755,805 | B2 * | 7/2010 | Sugeta et al. ................. | 358/461 |
| 8,064,105 | B2 * | 11/2011 | Murakami et al. ............ | 358/461 |
| 8,159,731 | B2 * | 4/2012 | Sato et al. ..................... | 358/497 |
| 2002/0033968 | A1 | 3/2002 | Chen | |
| 2005/0157351 | A1 | 7/2005 | Matsuda | |
| 2006/0139700 | A1 | 6/2006 | Murakami et al. | |

(Continued)

FOREIGN PATENT DOCUMENTS

EP 1 761 027 A1 3/2007
JP 4-371072 12/1992

(Continued)

OTHER PUBLICATIONS

Extended European Search Report dated Oct. 8, 2010.

(Continued)

*Primary Examiner* — Negussie Worku
(74) *Attorney, Agent, or Firm* — Scully, Scott, Murphy & Presser, PC (57) ABSTRACT

An image reader is provided, which includes a feeder feeding a document sheet, a first reading sensor, a first reference member, a moving mechanism moving the first reading sensor to a document reading position to read an image of the document sheet and a reference reading position to read an image of the first reference member, and a controller that controls the moving mechanism to move the first reading sensor to the reference reading position, controls the first reading sensor to read the image of the first reference member, and controls the moving mechanism to move the first reading sensor to the document reading position after the first reading sensor reads the image of the first reference member. The controller controls the feeder to start feeding the document sheet to the document reading position before the first reading sensor reaches the document reading position from the reference reading position.

15 Claims, 4 Drawing Sheets

U.S. PATENT DOCUMENTS

| | | |
|---|---|---|
| 2008/0137107 A1 | 6/2008 | Futami |
| 2009/0027745 A1 | 1/2009 | Kweon |
| 2009/0122367 A1 | 5/2009 | Murakami et al. |
| 2009/0153917 A1* | 6/2009 | Shiraishi ................ 358/474 |

FOREIGN PATENT DOCUMENTS

| | | |
|---|---|---|
| JP | 5-83480 | 4/1993 |
| JP | 2000-59621 | 2/2000 |
| JP | 2000-196881 | 7/2000 |
| JP | 2002-359725 | 12/2002 |
| JP | 2003-8850 | 1/2003 |
| JP | 2004-282528 | 10/2004 |
| JP | 2004-297721 | 10/2004 |
| JP | 2004-357070 | 12/2004 |
| jp | 2004-357144 | 12/2004 |
| JP | 2004-357190 | 12/2004 |
| JP | 2006-186410 | 7/2006 |
| JP | 2006-217481 | 8/2006 |
| JP | 2009-33723 | 2/2009 |

OTHER PUBLICATIONS

Notification of Reasons for Rejection dated Aug. 30, 2011 from the Japanese Patent Office from related Japanese Application No. 2009-251118, together with an English-language translation.

* cited by examiner

IMAGE READER, IMAGE FORMING DEVICE HAVING THE SAME, AND COMPUTER-READABLE STORAGE MEDIUM FOR THE SAME

CROSS-REFERENCE TO RELATED APPLICATION

This application claims priority under 35 U.S.C. §119 from Japanese Patent Application No. 2009-251118 filed on Oct. 30, 2009. The entire subject matter of the application is incorporated herein by reference.

BACKGROUND

1. Technical Field

The following description relates to one or more technologies for an image reader.

2. Related Art

An image reader has been known that includes a feeding mechanism configured to feed a document sheet from a document tray to a document reading position. Specifically, the known image reader includes a reading sensor movable between the document reading position and a white-reference reading position facing a white reference member. In response to a user instruction being issued to read an image, the image reader firstly moves the reading sensor from the document reading position to the white-reference reading position, and then adjusts a white level based on light from the white reference member. Thereafter, the image reader controls the reading sensor to return to the image reading position, and begins to feed a document sheet with the feeding mechanism.

SUMMARY

However, the known image reader does not start document feeding until the reading sensor returns to the document reading position from the white-reference reading position. Therefore, the known image reader has a problem that reading of a document image is started at timing delayed by a time taken for control to move the reading sensor.

Aspects of the present invention are advantageous to provide one or more improved techniques for an image reader that make it possible to begin to read a document image at timing earlier than that of the known image reader.

According to aspects of the present invention, an image reader is provided, which includes a feeder configured to feed a document sheet to a document reading position, a first reading sensor configured to read an image, a first reference member, a moving mechanism configured to move the first reading sensor to any of the document reading position to read an image of the document sheet fed by the feeder and a reference reading position to read an image of the first reference member, and a controller configured to control the moving mechanism to move the first reading sensor to the reference reading position, control the first reading sensor to read the image of the first reference member in the reference reading position, and control the moving mechanism to move the first reading sensor to the document reading position after the first reading sensor reads the image of the first reference member. The controller controls the feeder to start feeding the document sheet to the document reading position before the first reading sensor reaches the document reading position from the reference reading position.

According to aspects of the present invention, further provided is an image forming device that includes an image reader configured to read an image of a document sheet and generate image data based on the read image, and an image forming unit configured to form an image based on the image data generated by the image reader. The image reader includes a feeder configured to feed the document sheet to a document reading position, a first reading sensor configured to read an image, a first reference member, a moving mechanism configured to move the first reading sensor to any of the document reading position to read the image of the document sheet fed by the feeder and a reference reading position to read an image of the first reference member, and a controller configured to control the moving mechanism to move the first reading sensor to the reference reading position, control the first reading sensor to read the image of the first reference member in the reference reading position, and control the moving mechanism to move the first reading sensor to the document reading position after the first reading sensor reads the image of the first reference member. The controller controls the feeder to start feeding the document sheet to the document reading position before the first reading sensor reaches the document reading position from the reference reading position.

According to aspects of the present invention, further provided is a computer-readable storage medium storing computer-readable instructions for controlling an image reader which includes a feeder configured to feed a document sheet to a document reading position, a first reading sensor configured to read an image, a first reference member, and a moving mechanism configured to move the first reading sensor to any of the document reading position to read an image of the document sheet fed by the feeder and a reference reading position to read an image of the first reference member. When executed by a processor, the instructions cause the processor to control the moving mechanism to move the first reading sensor to the reference reading position, control the first reading sensor to read the image of the first reference member in the reference reading position, and control the moving mechanism to move the first reading sensor to the document reading position after the first reading sensor reads the image of the first reference member. The instructions further cause the processor to control the feeder to start feeding the document sheet to the document reading position before the first reading sensor reaches the document reading position from the reference reading position.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

1. Electrical Configuration of MFP

Figure 1:
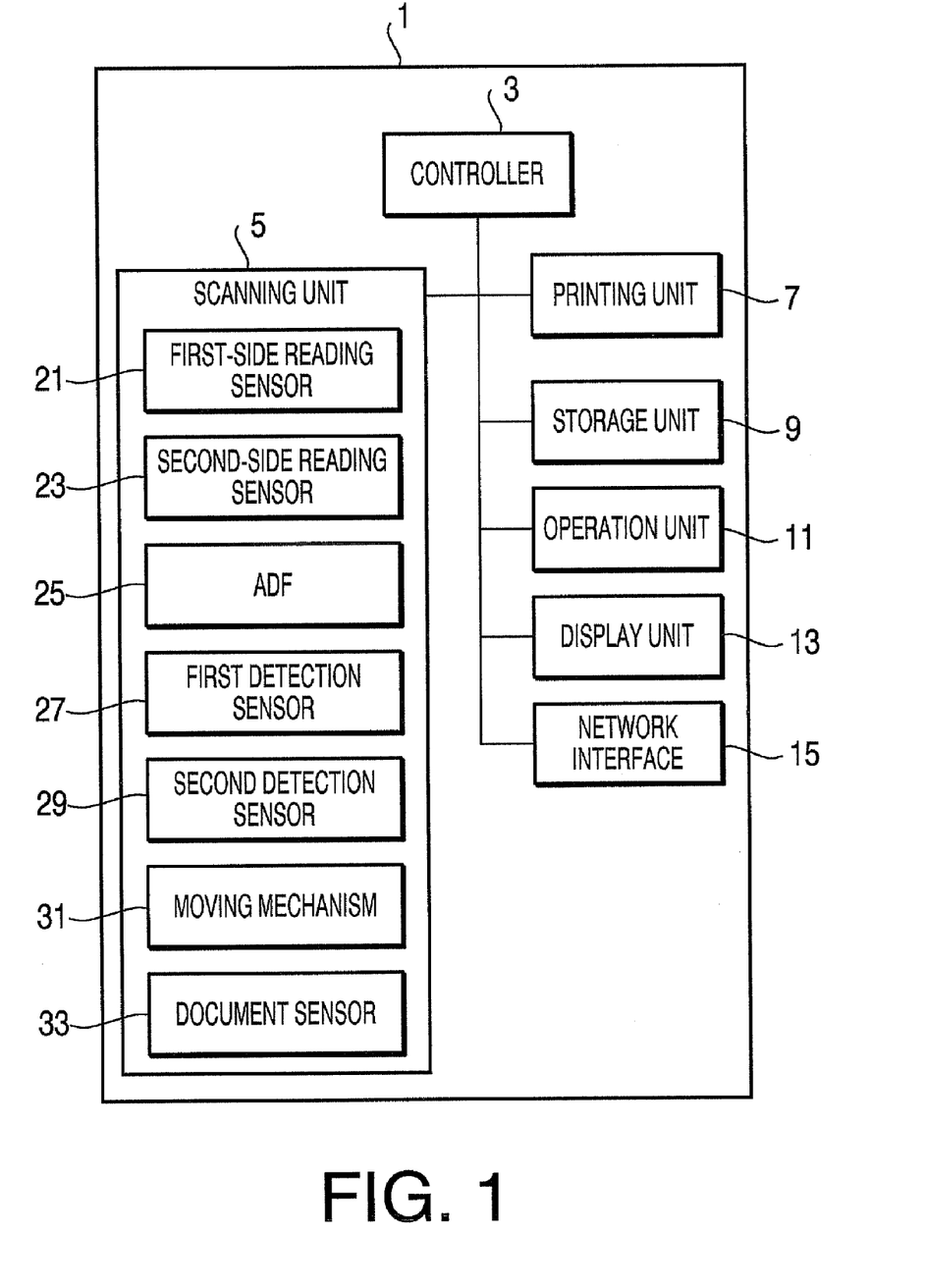
FIG. 1 is a block diagram showing an electrical configuration of a multi-function peripheral (MFP) in an embodiment according to one or more aspects of the present invention.

As shown in FIG. 1, a multi-function peripheral (MFP) 1 in the embodiment, which has multiple functions such as a copy function and a scanning function, includes a controller 3, a scanning unit 5, a printing unit 7, a storage unit 9, an operation unit 11, a display unit 13, and a network interface 15.

The controller 3 includes a CPU, a ROM, and a RAM. The ROM stores an image reading control program for executing a below-mentioned scanning process and programs for executing various operations of the MFP 1. In accordance with a program read out of the ROM, the controller 3 controls each unit included in the MFP 1 while storing, onto the RAM, processing results acquired during the control. In addition, the controller 3 has a circuit (not shown) for controlling a motor that drives a below-mentioned automatic document feeder (ADF) 25 and a circuit (not shown) for controlling a motor that drives a below-mentioned moving mechanism 31. Thus, the controller 3 separately controls the ADF 25 and the moving mechanism 31.

The scanning unit is configured to read an image of a document sheet M and generate image data (hereinafter referred to as read data) corresponding to the read image. The scanning unit 5 includes a first-side reading sensor 21, a second-side reading sensor 23, the ADF 25, a first detection sensor 27, a second detection sensor 29, a moving mechanism 31, and a document sensor 33. A specific configuration of the scanning unit 5 will be described later.

The printing unit 7 is configured to print on a sheet an image (a monochrome image or a color image) based on image data such as the aforementioned read data in an electrophotographic method or an inkjet method. The storage unit 9 is a non-volatile memory such as an NVRAM, a flash ROM, and an HDD and configured to store the aforementioned read data. The operation unit 11 includes a plurality of operable buttons through which a user can input various kinds of data. The display unit 13 is provided with a liquid crystal display (LCD) device and lamps and configured to display various setting screens and operational statuses.

The network interface 15 is connected with an external device (not shown, e.g., a personal computer etc.) via a network cable (not shown), so as to achieve mutual data communication between the MFP 1 and the external device.

2. Configuration of Scanning Unit

Figure 2:
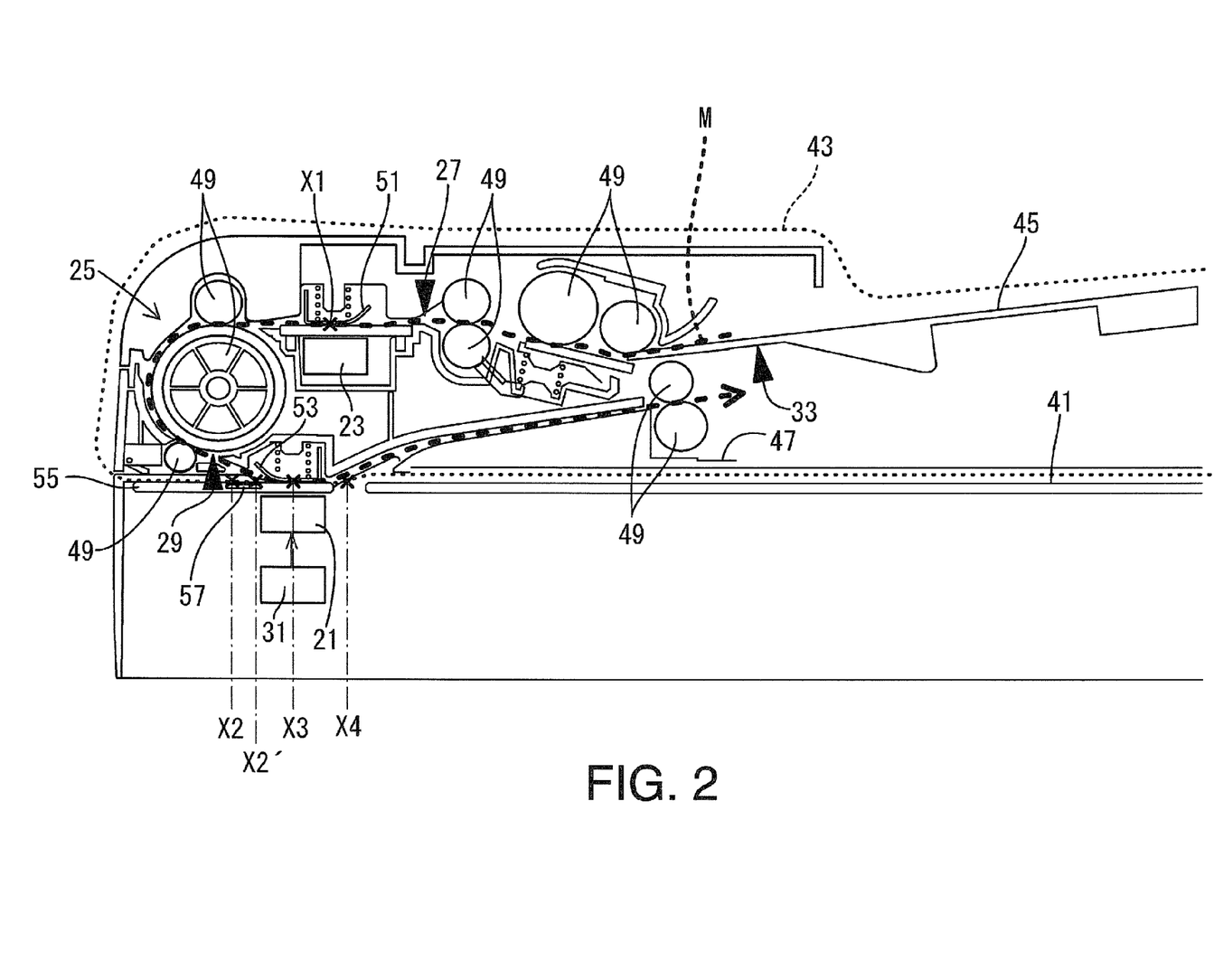
FIG. 2 is a cross-sectional side view showing an internal configuration of a scanning unit of the MFP in the embodiment according to one or more aspects of the present invention.

As depicted in FIG. 2, the MFP 1 (the scanning unit 5) has a flatbed (FB) glass plate 41 disposed above a main body in which the printing unit 7 is incorporated. Further, a document table cover 43 for covering the FB glass plate 41 is provided to be opened and closed relative to a frame of the FB glass plate 41. Additionally, an ADF glass plate 55 is disposed under the document table cover 43.

The first-side reading sensor 21 and the moving mechanism 31 are disposed under the FB glass plate 41 or the ADF glass plate 55. Meanwhile, the second-side reading sensor 23, the ADF 25, the first detection sensor 27, the second detection sensor 29, and the document sensor 33 are provided inside the document table cover 43. It is noted that each of the reading sensors 21 and 23 includes a light emitter (not shown) and an image sensor (not shown) that has a plurality of light receiving elements linearly arranged to receive the light, emitted by the light emitter and reflected by a document sheet M, and output, as the read data, an electric signal corresponding to the light intensity (brightness) of the received light.

The document table cover 43 includes a document tray 45 configured such that a document sheet M is placed thereon, and a catch tray 47 disposed under the document tray 45. Further, the document sensor 33 is disposed near the document tray 45. The document sensor 33 is configured to detect whether there is a document sheet M on the document tray 45 and transmit the result of the detection to the controller 3.

In the document table cover 43, a feeding path is formed to feed a document sheet M from the document tray 45 to the catch tray 47, making the document sheet M U-turn. The ADF 25 includes a plurality of feed rollers 49 disposed on the feeding path and a document holder 53.

The second-side reading sensor 23 is disposed at a side close to a turning point where the document sheet M U-turns, on a first half section (i.e., a section from the document tray 45 to the turning point) of the feeding path. The second-side reading sensor 23 reads an image on a second side of the document sheet M fed from the document tray 45 (i.e., a down-facing side of the document sheet M in a state placed on the document tray 45), and transmits read data corresponding to the second-side image to the controller 3. The second-side reading sensor 23 is fixedly disposed to face a second-side white reference member 51 across the feeding path. It is noted that hereinafter, a position where the second-side white reference member 51 is disposed to face the second-side reading sensor 23 will be referred to as a "second-side reading position X1."

At an upstream side in a document feeding direction (hereinafter, simply referred to as an "upstream side") relative to the second-side reading position X1, the first detection sensor 27 is disposed. The first detection sensor 27 detects the document sheet M approaching the second-side reading position X1, and transmits the result of the detection to the controller 3.

The first-side reading sensor 21 is disposed at a side close to the turning point, on a second half section (i.e., a section from the turning point to the catch tray 47) of the feeding path. The first-side reading sensor 21 reads an image on a first side of the document sheet M (i.e., an up-facing side of the document sheet M in the state placed on the document tray 45), and transmits read data corresponding to the first-side image to the controller 3.

The first-side reading sensor 21 is configured to be movable by the moving mechanism 31, in a left-to-right direction in FIG. 2, in parallel to the FB glass plate 41 and the ADF glass plate 55. Specifically, on a down-facing side of the ADF glass plate 55, a first-side white reference member 57 is disposed. Further, a section beneath the document holder 53 is defined as a first-side reading section in an ADF feeding operation. The moving mechanism 31 is configured to move the first-side reading sensor 21 to positions to face the first-side white reference member 57 (hereinafter referred to as a first reference reading position X2 and a second reference reading position X2'), a position to face the first-side reading section (hereinafter referred to as a first-side reading position X3), and a position beneath the FB glass plate 41.

At an upstream side relative to the document holder 53, the second detection sensor 29 is disposed that is configured to detect the document sheet M approaching the first-side reading position X3 and transmit the result of the detection to the controller 3.

The MFP 1 has an FB scanning function implemented when the document sensor 33 does not detect a document sheet M on the document tray 45, and an ADF scanning function implemented when the document sensor 33 detects a document sheet M on the document tray 45. The FB reading function is a function to read an image of a document sheet M placed statically on the FB glass plate 41. In execution of the FB reading function, the first-side reading sensor 21 reads an image on a down-facing side of the document sheet M placed statically on the FB glass plate 41 while being moved to an auxiliary scanning direction (from the left side to the right side in FIG. 2) beneath the FB glass plate 41.

The ADF reading function is a function to read an image of a document sheet M being fed automatically with the ADF 25. The ADF reading function includes a single-side reading function and a double-side reading function. In the single-side reading function, the first-side reading sensor 21 reads a first side of the document sheet M. In the double-side reading function, the first-side reading sensor 21 reads the first side of the document sheet M while the second-side reading sensor 23 reads the second side of the document sheet M. In the following description, the double-side reading function will be set forth in detail.

3. Double-Side Reading Function

When a user issues an instruction to carry out the double-side reading function via the operation unit 11 or an input unit of the external device, the controller 3 perform a double-side document reading process. It is noted that when the double-side document reading process is launched, the first-side reading sensor 21 initially stays in a standby position X4, which is in a boundary region between the FB glass plate 41 and the ADF glass plate 55.

Figure 3:
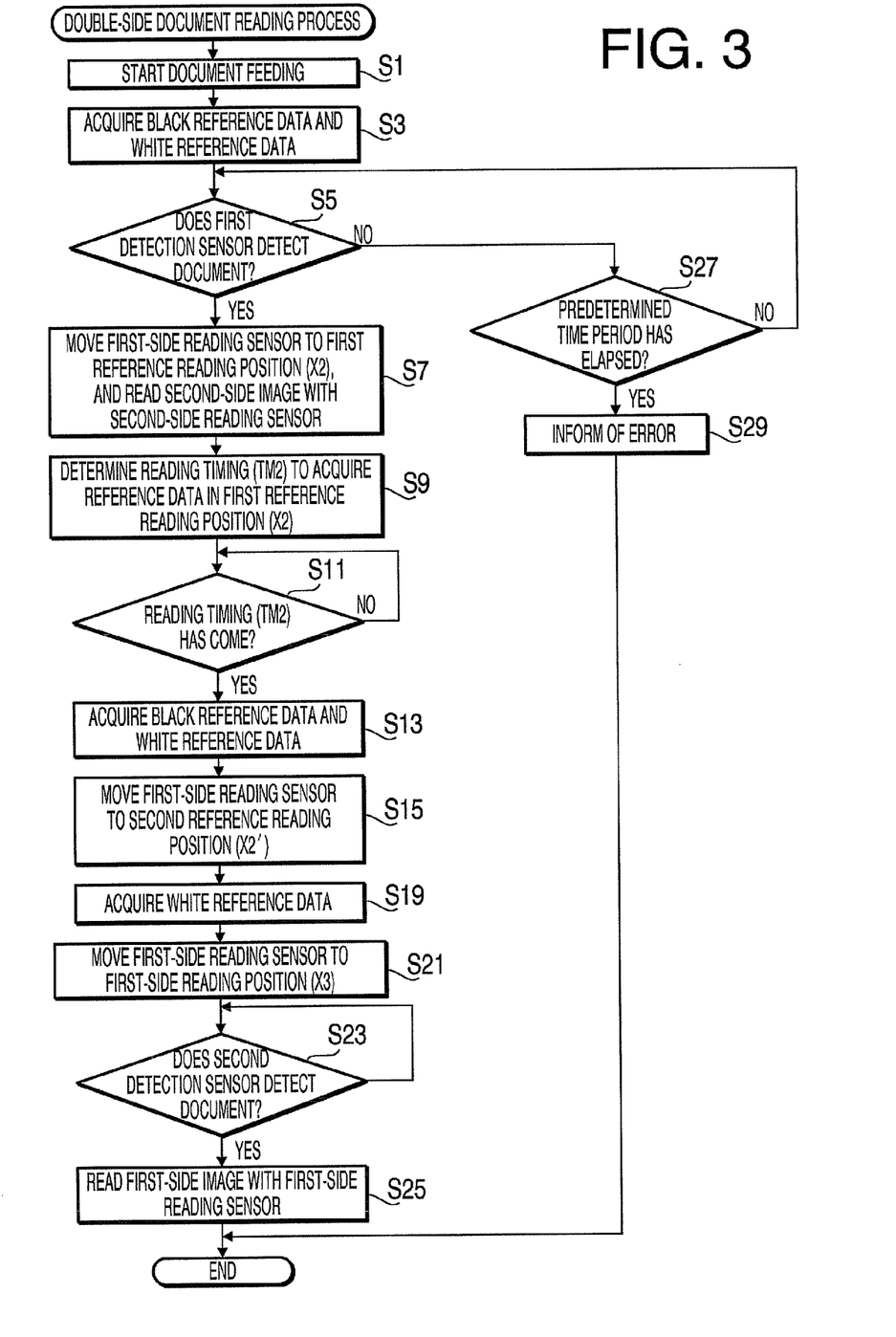
FIG. 3 is a flowchart showing a procedure of a double-side document reading process to be executed by a controller of the MFP in the embodiment according to one or more aspects of the present invention.

Referring to FIG. 3, in the double-side document reading process, the controller 3 first drives the ADF 25 and begins to feed a document sheet M (Si). Then, the controller 3 performs an operation to prepare for a second-side reading process within a time period T1 (see FIG. 4), which is taken for a leading end of the document sheet M to move from the document tray 45 to a detectable area of the first detection sensor 27. The operation to prepare for the second-side reading process contains an operation to acquire black reference data and white reference data for shading correction.

The shading correction is an operation, to correct a reading error caused due to various variations, such as a variation of sensitivities of the light receiving elements of the reading sensors 21 and 23, a variation in the light intensity of light received by the light receiving elements which are disposed in respective different positions, and a variation in brightness of light emitted by the light emitter. The shading correction is generally carried out using the following formula. It is noted that an electric signal (pixel data) corresponding to the light intensity of light received by each light receiving element is represented with a scale of 256 shades of gray from 0 (black) to 255 (white).

(Formula) corrected pixel data=[(uncorrected pixel data−black reference data)/(white reference data−black reference data)]×255

The white reference data is determined by averaging a plurality of pieces of pixel data output from the light receiving elements of the image sensors (the reading sensors 21 and 23) that read (images of) the white reference members 51 and 57 more than once. The white reference data is generated in a state where the document table cover 43 is closed to block external light and the light emitters of the reading sensors 21 and 23 are turned on. The reason why the white reference members 51 and 57 are read more than once is to reduce the effect of electric noises.

The black reference data is determined by averaging a plurality of pieces of pixel data output from the light receiving elements of the image sensors (the reading sensors 21 and 23) that perform reading more than once. The black reference data is generated in a state (a dark state) where the document table cover 43 is closed to block external light and the light emitters of the reading sensors 21 and 23 are turned off.

Using the second-side reading sensor 23, the controller 3 acquires the black reference data and subsequently the white reference data (S3). After that, when the first detection sensor 27 does not detect the leading end of the document sheet M even after lapse of a predetermined time period (S5: No and S27: Yes), the controller 3 informs the user of an error, e.g., by displaying information about the error on the display unit 13 (S29). Thereafter, the controller 3 terminates the double-side document reading process.

Meanwhile, when the first detection sensor 27 detects the leading end of the document sheet M within the predetermined time period (S5: Yes), the controller 3 performs the second-side reading process and an operation to prepare for a first-side reading process within a time period T2 (see FIG. 4) until the second detection sensor 29 detects the leading end of the document sheet M.

Specifically, when the first detection sensor 27 detects the leading end of the document sheet M at a time (detection timing TM1) (S5: Yes), the controller 3 controls the moving mechanism 31 to move the first-side reading sensor 21 from the standby position X4 to the first reference reading position X2 (S7). Further, the controller 3 controls the second-side reading sensor 23 to read the image on the second side (the down-facing side) of the document sheet M that is passing through the second-side reading position X1 (S7).

Next, the controller 3 determines a time (reading timing TM2) to read the white reference data in the first reference reading position X2 (S9). For instance, the storage unit 9 previously stores a conveying time period T3 taken for the leading end of the document sheet M to be conveyed from the detection area of the first detection sensor 27 to the first-side reading position X3. Based on the conveying time period T3 and the detection timing TM1, the controller 3 determines a time (reaching timing TM4, TM4=TM1+T3) when the leading end of the document sheet M reaches the first-side reading position X3).

In addition, the storage unit 9 stores a first moving time period T4, a second moving time period T5, a first acquiring time period T6, and a second acquiring time period T7. The first moving time period T4 is a time period taken for the first-side reading sensor 21 to move from the first reference reading position X2 to the second reference reading position X2'. The second moving time period T5 is a time period taken for the first-side reading sensor 21 to move from the second reference reading position X2' to the first-side reading position X3. The first acquiring time period T6 is a time period taken for acquiring the black reference data and the white reference data in the first reference reading position X2. The second acquiring time period T7 is a time period taken for acquiring the white reference data in the second reference reading position X2'.

Then, the controller 3 determines the reading timing TM2 in accordance with the following formula.

$$TM2=TM4-T5-T7-T4-T6-\alpha$$

Thus, since the reading timing TM2 is set to be as late as possible, it is possible to improve accuracy of the shading correction by acquiring the latest white reference data at a time as close as possible to a time to read the first side of the document sheet M. It is noted that "α" is a supplemental time period for guaranteeing that after acquiring the white reference data in the second reference reading position X2', the first-side reading sensor 21 certainly completes movement from the second reference reading position X2' to the first-side reading position X3 within the time period T2 until the second detection sensor 29 detects the leading end of the document sheet M. The supplemental time period α is previously determined through experiments and stored in the storage unit 9.

When determining that the reading timing TM2 has come (S11: Yes), the controller 3 acquires the black reference data and the white reference data in the first reference reading position X2 using the first-side reading sensor 21 (S13). Then, the controller 3 controls the moving mechanism 31 to move the first-side reading sensor 21 from the first reference reading position X2 to the second reference reading position X2' (S15). After that, the controller 3 acquires the white reference data in the second reference reading position X2' with the first-side reading sensor 21 (S19). Thereafter, the controller 3 controls the moving mechanism 31 to move the first-side reading sensor 21 from the second reference reading position X2' to the first-side reading position X3 (S21).

Subsequently, when the second detection sensor 29 detects the leading end of the document sheet M (S23: Yes), the controller 3 controls the first-side reading sensor 21 to read the image on the first side of the document sheet M which is passing through the first-side reading position X3 (S25). Thereafter, the controller 3 terminates the double-side document reading process.

4. Effects

According to the embodiment, feeding of the document sheet M is started before the first-side reading sensor 21 reaches the first-side reading position X3 from the reference reading positions X2 and X2'. Therefore, it is possible to read the image on the first side of the document sheet M at timing earlier than a known image reader. Especially, in the embodiment, since the feeding of the document sheet M is started before the first-side reading sensor 21 begins to move to the reference reading positions X2 and X2', it is possible to read the image on the first side of the document sheet M at further earlier timing.

Figure 4:
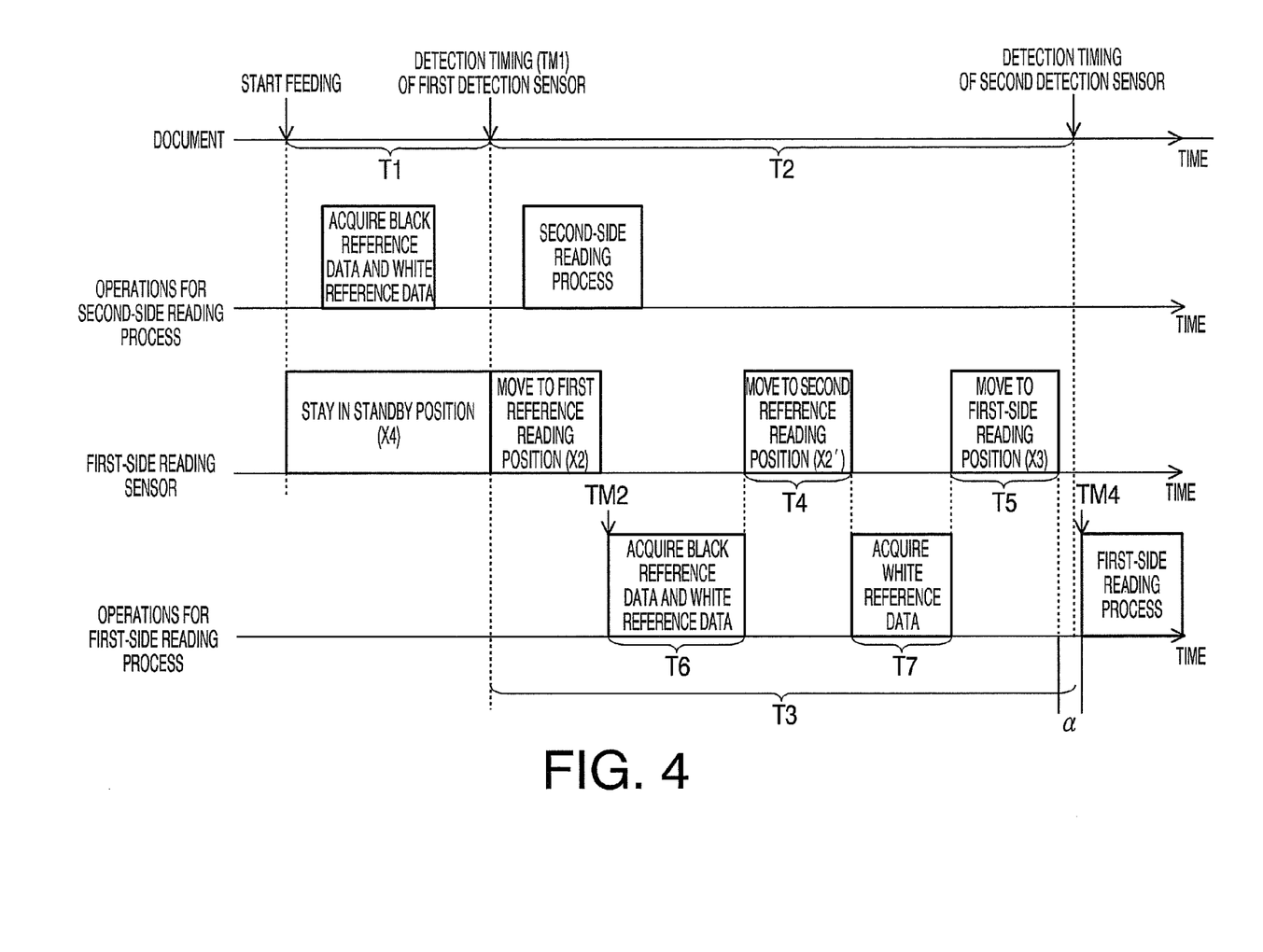
FIG. 4 is a timing chart showing a time (timing) to carry out each of operations in the double-side document reading process in the embodiment according to one or more aspects of the present invention.

Further, in response to the first detection sensor 27 detecting the leading end of the document sheet M, the first-side reading sensor 21 is controlled to start moving to the first reference reading position X2 (see FIGS. 3 and 4). Thus, it is possible to prevent an undesired situation that driving of the first-side reading sensor 21 is started though a feeding error occurs that the document sheet M is not normally fed.

Further, the operation of reading the second-side white reference member 51 (acquiring the white reference data) with the second-side reading sensor 23 and the operation of reading the first-side white reference member 57 (acquiring the white reference data) with the first-side reading sensor 21 are performed at respective different times. Thereby, it is possible to lighten a control load of the controller 3 more than such a configuration that the both operations of acquiring the white reference data are carried out at the same time.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

<Modifications>

In the aforementioned embodiment, the image based on the read data is formed (output) as an image printed on the document sheet M by the printing unit 7. However, the image based on the read data may be formed (output) as an image displayed on the display unit 13 by the controller 3.

In the aforementioned embodiment, in response to the first detection sensor 27 detecting the document sheet M, the first-side reading sensor 21 is controlled to start moving to the first reference reading position X2. However, in response to lapse of a predetermined time period after the feeding of the document sheet M is started, the first-side reading sensor 21 may be controlled to start moving to the first reference reading position X2.

In the aforementioned embodiment, the feeding of the document sheet M is started before the first-side reading sensor 21 begins to move to the reference reading positions X2 and X2'. However, the feeding of the document sheet M may be started after the operation required in advance of the second-side reading (S3 in FIG. 3) is executed and the first-side reading sensor 21 is moved from the standby position X4 to the first reference reading position X2. Namely, the feeding of the document sheet M may be started before the first-side reading sensor 21 reaches the first reference reading position X3 from the reference reading position X2'.

the position of the second-side reading sensor 23 is not limited to the same position as exemplified in the aforementioned embodiment. In this respect, however, the second-side reading sensor 23 is desired to be disposed at the side close to the turning point on the first half section (i.e., the section from the document tray 45 to the turning point) of the feeding path, as shown in the aforementioned embodiment. This is because as a feeding distance between the second-side reading sensor 23 and the first-side reading sensor 21 is longer, the operation of reading the second-side white reference member 51 (acquiring the white reference data) with the second-side reading sensor 23 and the operation of reading the first-side white reference member 57 (acquiring the white reference data) with the first-side reading sensor 21 are performed at more different times, respectively. Thus, it is more easily achieved to lighten the control load of the controller 3.

Further, the first-side white reference member 57 may be disposed in an arbitrary position such as the end (the left end in FIG. 2) in the direction (from the right side to the left side in FIG. 2) opposite to the auxiliary scanning direction under the ADF glass late 55. In addition, the standby position X4 for the first-side reading sensor 21 may be located at the end (the left end in FIG. 2) in the direction (from the right side to the left side in FIG. 2) opposite to the auxiliary scanning direction under the ADF glass late 55. In this respect, however, preferably, the position of the first-side white reference member 57 and the standby position X4 of the first-side reading sensor 21 may be set such that a distance between the standby position X4 of the first-side reading sensor 21 and the reference reading position X2 (X2') for reading the first-side white reference member 57 and a distance between the reading position X2 (X2') for reading the first-side white reference member 57 and the first-side reading position X3 are shorter. In this case, it is possible to shorten a time taken for movement of the first-side reading sensor 21. Thus, even though the feeding of the document sheet M is started at earlier timing, it is possible to complete the operation to prepare for the first-side reading process by the time when the document sheet M reaches the first-side reading position X3.

Aspects of the present invention may be applied in single-side reading. Further, aspects of the present invention may be applied to an image forming device having only the first-side reading sensor 21 as a necessary reading sensor. In this case, in the process as shown in FIG. 3, the operation in S3 and a partial operation in S7 (i.e., the operation to read the image on the second side with the second-side reading sensor 23) can be omitted.

In the aforementioned embodiment, the white reference data is acquired twice. However, the white reference data may be acquired only once when there is not much time. On the contrary, the white reference data may be acquired three or more times when there is enough time to do so.

In the case where it is determined that the first-side reading sensor 21 does not completely move to the first-side reading position X3 at the time when the second detection sensor 29 detects the document sheet M, the feeding of the document sheet M may be interrupted once. Then, the document sheet M may be fed again after the first-side reading sensor 21 moves to the first-side reading position X3 from the reference reading position X2 (X2') for reading the first-side white reference member 57.

The supplemental time period $\alpha$ may be set shorter than exemplified in the aforementioned embodiment, in the case where it is permitted that the first-side reading sensor 21, which has acquired the white reference data in the second reference reading position X2', completely move to the first-side reading position X3 from the second reference reading position X2' after the second detection sensor 29 detects the leading end of the document sheet M. As the supplemental time period $\alpha$ is set shorter, the black reference data and the white reference data can be acquired at later timing (i.e., at a time as close as possible to the time to read the first side of the document sheet M). Nonetheless, as the supplemental time period $\alpha$ is set shorter, in the case where a feeding error occurs, it may be less likely to completely acquire the black reference data and the white reference data with the first-side reading sensor 21 by the time when the document sheet M reaches the first-side reading position X3.

Further, for instance, the reading timing TM2 to read the black reference data and the white reference data may be determined based on not the reaching timing TM4 but the detection time for the second detection sensor 29 to detect the leading end of the document sheet M. Thereby, even though a slight feeding error occurs, it is more likely to completely acquire the black reference data and the white reference data with the first-side reading sensor 21 by the time when the document sheet M reaches the first-side reading position X3 in comparison with the case where the reading timing TM2 is determined based on the reaching timing TM4 (in the case of the same supplemental time period $\alpha$). In this case, however, it may be harder to acquire the latest white reference data (at a time as close as possible to the time to read the first side of the document sheet M).

In reading a plurality of document sheets M fed by the ADF 25, when the acquisition of the black reference data and the white reference data is implemented between a precedent document sheet M and a subsequently-fed document sheet M, the first-side reading sensor 21 may be moved during the document feeding.

When the conveying time period T3 taken for the leading end of the document sheet M to be conveyed from the detection area of the first detection sensor 27 to the first-side reading position X3 is constant, the reading timing TM2 is not necessarily be determined in each document reading process. Since the time periods T4 to T7 are constant, the reading timing TM2 is definitely determined as a predetermined value. In this case, the reading timing TM2 may previously be stored. When a time period taken for document reading by the second-side reading sensor 23 (which time period may contain a time period taken for acquisition of the black reference data and the white reference data) varies depending on image reading resolutions, namely, when the conveying time period T3 varies depending on the image reading resolutions, the reading timing TM2 may be stored in association with each of the image reading resolutions. Further, when the conveying time period T3 is measured in each document reading process and the average value of the conveying time periods T3 is employed for a subsequent document reading process, the reading timing TM2 may be determined in each document reading process. In this case, even though the conveying time period T3 varies between different document reading processes, it is possible to appropriately determine the reading timing TM2.

In the double-side document reading process shown in FIG. 3, instead of determining the reading timing TM2 to read the first-side white reference member 57 after execution of S7, a time (timing) to begin to move the first-side reading sensor 21 from the standby position X4 to the first reference reading position X2 may be determined after execution of S5. In this case, after the controller 3 begins to move the first-side reading sensor 21 from the standby position X4 to the first reference reading position X2 at the determined timing, the respective operations during the time periods T6, T4, T7, and T5 are sequentially executed. Not only the reading timing TM2 to acquire the black reference data and the white reference data in the first reference reading position X2 but also second reading timing to acquire the white reference data in the second reference reading position X2' may be determined.

What is claimed is:

1. An image reader comprising:
    a feeder configured to feed a document sheet to a document reading position;
    a first reading sensor configured to read an image;
    a first reference member;
    a moving mechanism configured to move the first reading sensor to the document reading position to read an image of the document sheet fed by the feeder and a reference reading position to read an image of the first reference member;
    a controller configured to:
        control the moving mechanism to move the first reading sensor to the reference reading position;
        control the first reading sensor to read the image of the first reference member in the reference reading position; and
        control the moving mechanism to move the first reading sensor to the document reading position after the first reading sensor reads the image of the first reference member; and a detector configured to detect the document sheet which is being fed by the feeder to the image reading position;

wherein the controller controls the feeder to start feeding the document sheet to the document reading position before the first reading sensor reaches the document reading position from the reference reading position, wherein based on a first time when the detector detects the document sheet, the controller determines a second time when the document sheet fed by the feeder reaches the document reading position, wherein the controller determines a third time when the first reference member is to be read by the first reading sensor, based on the second time and a first time period, the first time period including:
- a second time period taken for the first reading sensor to read the image of the first reference member; and
- a third time period taken for the first reading sensor to move from the reference reading position to the document reading position, and wherein the controller controls the first reading sensor to read the image of the first reference member at the third time.

2. The image reader according to claim 1,
wherein the controller controls the feeder to start feeding the document sheet to the document reading position before the first reading sensor starts moving to the reference reading position.

3. The image reader according to claim 2,
wherein in response to the detector detecting the document sheet, the controller controls the moving mechanism to start moving the first reading sensor to the reference reading position.

4. The image reader according to claim 1,
wherein the controller controls the first reading sensor to read the image of the first reference member a plurality of times.

5. The image reader according to claim 1,
wherein the first reading sensor is configured to read an image on a first side of the document sheet,
wherein the image reader further comprises:
- a second reading sensor disposed upstream relative to the first reading sensor in a feeding direction in which the feeder feeds the document sheet, the second reading sensor being configured to read an image on a second side that is a reverse side of the first side of the document sheet; and
- a second reference member, and wherein in a process of reading the images on the first and second sides of the document sheet, after controlling the second reading sensor to read an image of the second reference member, the controller controls the moving mechanism to move the first reading sensor to the reference reading position.

6. An image forming device comprising:
an image reader configured to read an image of a document sheet and generate image data based on the read image; and
an image forming unit configured to form an image based on the image data generated by the image reader,
wherein the image reader comprises:
a feeder configured to feed the document sheet to a document reading position;
a first reading sensor configured to read an image;
a first reference member;
a moving mechanism configured to move the first reading sensor to the document reading position to read the image of the document sheet fed by the feeder and a reference reading position to read an image of the first reference member;
a controller configured to:
- control the moving mechanism to move the first reading sensor to the reference reading position;
- control the first reading sensor to read the image of the first reference member in the reference reading position; and
- control the moving mechanism to move the first reading sensor to the document reading position after the first reading sensor reads the image of the first reference member; and a detector configured to detect the document sheet which is being fed by the feeder to the image reading position;

wherein the controller controls the feeder to start feeding the document sheet to the document reading position before the first reading sensor reaches the document reading position from the reference reading position, wherein based on a first time when the detector detects the document sheet, the controller determines a second time when the document sheet fed by the feeder reaches the document reading position, wherein the controller determines a third time when the first reference member is to be read by the first reading sensor, based on the second time and a first time period, the first time period including:
- a second time period taken for the first reading sensor to read the image of the first reference member; and
- a third time period taken for the first reading sensor to move from the reference reading position to the document reading position, and wherein the controller controls the first reading sensor to read the image of the first reference member at the third time.

7. The image forming device according to claim 6,
wherein the controller controls the feeder to start feeding the document sheet to the document reading position before the first reading sensor starts moving to the reference reading position.

8. The image forming device according to claim 7,
wherein in response to the detector detecting the document sheet, the controller controls the moving mechanism to start moving the first reading sensor to the reference reading position.

9. The image forming device according to claim 6,
wherein the controller controls the first reading sensor to read the image of the first reference member a plurality of times.

10. The image forming device according to claim 6,
wherein the first reading sensor is configured to read an image on a first side of the document sheet,
wherein the image reader further comprises:
- a second reading sensor disposed upstream relative to the first reading sensor in a feeding direction in which the feeder feeds the document sheet, the second reading sensor being configured to read an image on a second side that is a reverse side of the first side of the document sheet; and
- a second reference member, and wherein in a process of reading the images on the first and second sides of the document sheet, after controlling the second reading sensor to read an image of the second reference member, the controller controls the moving mechanism to move the first reading sensor to the reference reading position.

11. A computer-readable storage medium storing computer-readable instructions for controlling an image reader which comprises:
- a feeder configured to feed a document sheet to a document reading position;
- a first reading sensor configured to read an image;
- a first reference member;
- a moving mechanism configured to move the first reading sensor to the document reading position to read an image of the document sheet fed by the feeder and a reference reading position to read an image of the first reference member; and
- a detector configured to detect the document sheet which is being fed by the feeder to the image reading position;

the instructions, when executed by a processor, causing the processor to:
- control the moving mechanism to move the first reading sensor to the reference reading position;
- control the first reading sensor to read the image of the first reference member in the reference reading position; and
- control the moving mechanism to move the first reading sensor to the document reading position after the first reading sensor reads the image of the first reference member, wherein the instructions further cause the processor to control the feeder to start feeding the document sheet to the document reading position before the first reading sensor reaches the document reading position from the reference reading position, wherein based on a first time when the detector detects the document sheet, the controller determines a second time when the document sheet fed by the feeder reaches the document reading position, wherein the controller determines a third time when the first reference member is to be read by the first reading sensor, based on the second time and a first time period, the first time period including:
- a second time period taken for the first reading sensor to read the image of the first reference member; and
- a third time period taken for the first reading sensor to move from the reference reading position to the document reading position, and wherein the controller controls the first reading sensor to read the image of the first reference member at the third time.

12. The computer-readable storage medium according to claim 11,
wherein the instructions further cause the processor to control the feeder to start feeding the document sheet to the document reading position before the first reading sensor starts moving to the reference reading position.

13. The computer-readable storage medium according to claim 12,
wherein the instructions further cause the processor to, in response to the detector detecting the document sheet, control the moving mechanism to start moving the first reading sensor to the reference reading position.

14. The computer-readable storage medium according to claim 11,
wherein the instructions further cause the processor to control the first reading sensor to read the image of the first reference member a plurality of times.

15. The computer-readable storage medium according to claim 11,
wherein the first reading sensor is configured to read an image on a first side of the document sheet,
wherein the image reader further comprises:
- a second reading sensor disposed upstream relative to the first reading sensor in a feeding direction in which the feeder feeds the document sheet, the second reading sensor being configured to read an image on a second side that is a reverse side of the first side of the document sheet; and
- a second reference member, and wherein the instructions further cause the processor to, in a process of reading the images on the first and second sides of the document sheet, after controlling the second reading sensor to read an image of the second reference member, control the moving mechanism to move the first reading sensor to the reference reading position.

* * * * *